United States Patent
George

(10) Patent No.: US 10,160,077 B2
(45) Date of Patent: Dec. 25, 2018

(54) TOOL CHANGING SYSTEM AND METHOD

(71) Applicant: DMG MORI SEIKI CO., LTD., Yamatokoriyama-shi (JP)

(72) Inventor: Robert George, Dixon, CA (US)

(73) Assignee: DMG MORI SEIKI CO., LTD., Yamatokoriyama-shi (JP)

( * ) Notice: Subject to any disclaimer, the term of this patent is extended or adjusted under 35 U.S.C. 154(b) by 807 days.

(21) Appl. No.: 13/849,186

(22) Filed: Mar. 22, 2013

(65) Prior Publication Data
US 2014/0287897 A1    Sep. 25, 2014

(51) Int. Cl.
*B23Q 3/157* (2006.01)
*B23Q 3/155* (2006.01)

(52) U.S. Cl.
CPC ....... *B23Q 3/15513* (2013.01); *B23Q 3/1554* (2013.01); *B23Q 3/15526* (2013.01);
(Continued)

(58) Field of Classification Search
CPC ............ B23Q 3/15513; B23Q 3/15573; B23Q 3/1554; Y10T 483/1748; Y10T 483/1783;
(Continued)

(56) References Cited

U.S. PATENT DOCUMENTS

| | | | | | |
|---|---|---|---|---|---|
| 3,161,951 | A | * | 12/1964 | Anthony | B23Q 3/15773 |
| | | | | | 483/40 |
| 3,516,149 | A | * | 6/1970 | Mickas | B23B 31/268 |
| | | | | | 279/102 |
| 4,087,901 | A | * | 5/1978 | Lohneis | B23Q 3/15526 |
| | | | | | 483/41 |
| 4,473,937 | A | * | 10/1984 | Ortlieb | B23B 29/03435 |
| | | | | | 29/26 R |
| 5,277,689 | A | * | 1/1994 | Ruetschle | B23Q 3/1554 |
| | | | | | 279/106 |
| 5,851,093 | A | * | 12/1998 | Erickson | B23B 29/046 |
| | | | | | 409/234 |

(Continued)

FOREIGN PATENT DOCUMENTS

| | | | | | |
|---|---|---|---|---|---|
| DE | 3501113 | A1 | * | 7/1986 | ........... B23B 39/205 |
| EP | 0216309 | A1 | * | 4/1987 | ........... B23B 31/006 |
| JP | 56157934 | A | * | 12/1981 | ......... B23Q 3/15526 |
| JP | 61226241 | A | * | 10/1986 | |

OTHER PUBLICATIONS

EPO Machine Translation of JP61226241A—Nakamura et al., "Automatic Tool Exchange Device," Oct. 8, 1986.*

*Primary Examiner* — Erica E Cadugan
*Assistant Examiner* — Michael Vitale
(74) *Attorney, Agent, or Firm* — Oblon, McClelland, Maier & Neustadt, L.L.P.

(57) ABSTRACT

A method, non-transitory computer-readable storage medium, and tool changing system for changing tools on a machine. The tool changing system includes a tool magazine, a tool transporter, and an automatic tool changer (ATC). The ATC includes a tool holder and a tool changer. The tool magazine is configured to store at least one tool received at the tool loading station. The tool transporter is configured to transport a tool from the tool loading station or the tool magazine to a tool transfer position of the ATC, and to hold the tool at the tool transfer position during an automatic tool change process. The tool holder is configured to hold the tool at the tool transfer position during the automatic tool change process when the tool transporter is not positioned at the tool transfer position. The tool changer is configured to provide the tool at the tool transfer position to a tool change position of a machine during the automatic tool change process.

7 Claims, 10 Drawing Sheets

(52) U.S. Cl.
CPC .............. *B23Q 3/15773* (2013.01); *B23Q 2003/155407* (2016.11); *Y10T 483/10* (2015.01); *Y10T 483/12* (2015.01); *Y10T 483/13* (2015.01); *Y10T 483/1755* (2015.01); *Y10T 483/1783* (2015.01); *Y10T 483/18* (2015.01); *Y10T 483/1864* (2015.01)

(58) Field of Classification Search
CPC ......... Y10T 483/1786; Y10T 483/1788; Y10T 483/18; Y10T 483/1864; Y10T 483/1757; Y10T 483/176; Y10T 483/1767; Y10T 483/1779; Y10S 483/902
USPC ........ 483/36, 51, 52, 53, 58, 65, 40, 41, 44, 483/49, 902
See application file for complete search history.

(56) References Cited

U.S. PATENT DOCUMENTS

| | | | |
|---|---|---|---|
| 6,450,932 B1 | 9/2002 | Hirose et al. | |
| 6,464,623 B1 | 10/2002 | Laur et al. | |
| 6,857,995 B2* | 2/2005 | Maeda | B23Q 3/15526 483/41 |
| 7,854,456 B2* | 12/2010 | Waldorf | B25J 15/0226 294/116 |
| 2002/0013202 A1* | 1/2002 | Kato | B23Q 3/1572 483/41 |
| 2006/0079384 A1* | 4/2006 | Yoshida | B23Q 3/15713 483/7 |

\* cited by examiner

TOOL CHANGING SYSTEM AND METHOD

BACKGROUND OF THE INVENTION

Field of the Invention

Embodiments described herein relate generally to a method, non-transitory computer-readable storage medium, and system for changing tools. More particularly, embodiments of the present disclosure relate to a method, non-transitory computer-readable storage medium, and system for changing machine tools.

Background

In a machining center, a plurality of different tools may be needed for a given machine to process a work piece. When the machine is configured to utilize only one tool at a time, the tool on the machine must be changed during different processing stages. Providing the necessary tool to the machine, however, takes time and thus increases the amount of time needed to complete processing of the work piece.

SUMMARY OF THE INVENTION

According to an embodiment of the present disclosure, there is provided a tool changing system. The tool changing system includes a tool magazine, a tool transporter, and an automatic tool changer (ATC). The ATC includes a tool holder and a tool changer. The tool magazine is configured to store at least one tool received at the tool loading station. The tool transporter is configured to transport a tool from the tool loading station or the tool magazine to a tool transfer position of the ATC, and to hold the tool at the tool transfer position during an automatic tool change process. The tool holder is configured to hold the tool at the tool transfer position during the automatic tool change process when the tool transporter is not positioned at the tool transfer position. The tool changer is configured to provide the tool at the tool transfer position to a tool change position of a machine during the automatic tool change process.

Further, according to an embodiment of the present disclosure, there is provided a method of a tool changing system including a tool magazine, a tool transporter, and an ATC for changing tools on a machine. The method includes transporting, by the tool transporter, a tool from a tool loading station or the tool magazine to a tool transfer position of the ATC. The tool magazine is configured to store at least one tool received at the tool loading station. The tool transporter holds the tool at the tool transfer position during an automatic tool change process when the tool transporter is positioned at the tool transfer position. A tool holder of the ATC holds the tool at the tool transfer position during the automatic tool change process when the tool transporter is not positioned at the tool transfer position. A tool changer of the ATC provides the tool to a tool change position of the machine during the automatic tool change process.

Further, according to an embodiment of the present disclosure, there is provided a non-transitory computer-readable storage medium storing a program which, when executed by a computer, causes the computer to perform the above-described method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
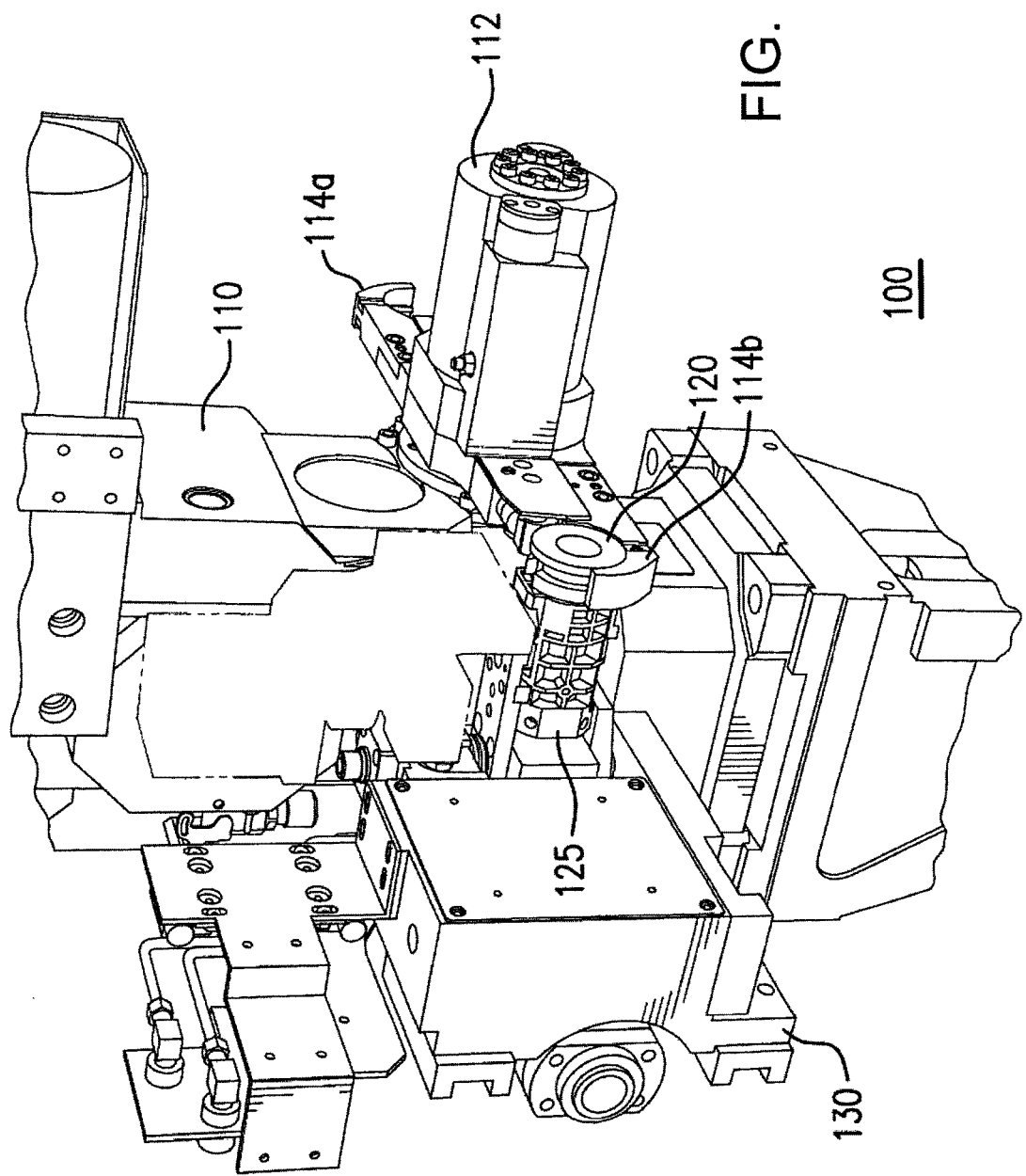
FIG. 1 illustrates an exemplary tool changing system.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

FIG. 1 illustrates an exemplary tool changing system 100. The tool changing system 100 includes an automatic tool changer (ATC) 110 and a tool transporter 130. The ATC 110 includes a tool changer 112. The tool changer 112 is configured to provide a tool 120 and/or tool pot 125 at a tool transfer position of the ATC 110 to a tool change position of a machine, and/or provide another tool and/or tool pot at the tool change position to the tool transfer position. Exemplary tools include cutting tools such as drills, milling tools, turning, tools, etc. Other cutting tools can include for example anything used in a milling or turning machine to remove material from or shape a work piece. Additional tool examples include specialty tools such as burnishing tools, sensor devices (e.g., work touch probes), work cleaning brushes, or part cleaning fans. The tool pot is configured to store one or more tools.

In one embodiment, the tool changer 112 is a double arm assembly that rotates to move one or more tools between the tool transfer and tool change positions. The double arm assembly 112 includes a first arm 114a and a second arm 144b. FIG. 1 illustrates the first arm 114a at a tool change position and the second arm 114b at a tool transfer position, according to certain embodiments of the present disclosure.

In one embodiment, the tool changer 112 includes a different number of arms (e.g., one arm). In other embodiments, the tool changer 112 moves the one or more tools between the tool transfer and tool change positions using other methods such as a conveyor assembly, along linear guides, etc.

In certain embodiments, the tool changer 112 moves in one or more different directions to allow the tool 120 and/or tool pot 125 to be removed from and/or placed in the tool transfer position. For example, the tool changer 112 is configured to move along an axis parallel to the rotation axis of the tool changer 112. In one embodiment, the tool changer 112 uses this movement to remove and/or place the tool 120 in the tool pot 125, or the tool 120 and the tool pot 125. Further, in one embodiment, the tool changer 112 uses this movement to remove and/or place the tool 120 and/or tool pot 125 on the machine, or to otherwise provide the tool and/or tool pot 125 to the tool change position. In another embodiment, the machine itself moves to remove and/or place the tool 120 and/or tool pot 125 on the machine.

In one embodiment, when a tool and/or tool pot on the machine (e.g., attached to a spindle of the machine) is located at the tool change position, the tool changer 112 rotates until the first arm 114a is positioned at the tool change position, at which time the first arm 114a holds the tool and/or tool pot on the machine. The holding can be performed by grasping, clamping, or any other method of securing the tool and/or tool pot on the machine to the first arm 114a. In one embodiment, the tool changer 112 is configured to move along an axis parallel to the rotation axis of the tool changer 112 to remove the tool and/or tool pot from, and/or place the tool and/or tool pot on, the machine. Subsequently, the tool changer 102 is rotated such that the tool and/or tool pot held by the first arm 114a is provided to the tool transfer position.

Similarly, when the tool 120 and/or tool pot 125 is to be provided to the machine, the tool changer 112 rotates such that the second arm 114b is positioned at the tool transfer position, at which time the second arm 114b holds the tool 120 and/or tool pot 125. In one embodiment, the second arm 114b holds the tool 120 and/or tool pot 125 in the same manner as the first arm 114a holds the tool and/or tool pot on the machine. However, in other embodiments, each of the first arm 114a and second arm 114b are configured with a plurality of different methods for securing a tool and/or tool pot to facilitate holding tools, and/or tool pots, of various shapes and/or sizes.

Further, in one embodiment, the tool changer 112 is configured to move along an axis parallel to the rotation axis of the tool changing mechanism 112 to remove or place the tool 120 and/or tool pot 125 at the tool transfer position. The tool changer 112 is then rotated such that the tool 120 and/or tool pot 125 held by the second arm 114b is moved to the tool change position.

The tool transporter 130 is configured to transport the tool 120 and/or tool pot 125 to and from the tool transfer position. In certain embodiments, the tool transporter 130 is also configured to transport the tool 120 and/or tool pot 125 between an operator tool loading station (also referred to as a tool setup station) and/or a tool magazine (e.g., a rack magazine). When the tool transporter 130 transports the tool 120 and/or tool pot 125 to the tool transfer position, the tool transporter 130 holds the tool 120 and/or tool pot 125 at the tool transfer position until the tool changer 112 holds the tool 120 and/or tool pot 125 to be provided to the tool change position. Thus, the tool transporter 130 is unable to perform another task until the tool 120 and/or tool pot 125 is held by the tool changer 112 and/or provided to the tool change position.

Certain embodiments of the present disclosure provide an ATC tool holder. The ATC tool holder allows the tool transporter 130 to perform one or more other tasks after the tool 120 is transported to the tool transfer position. That is, the ATC tool holder allows the tool transporter 130 to be utilized for multiple tasks while reducing delay in machine operation.

The ATC tool holder allows the tool transporter 130 to perform other tasks such as moving one or more tools between the operator tool loading station and the tool magazine, moving a tool between the tool transfer position and the operator tool loading station, moving a tool between the tool transfer position and the tool magazine, rearranging one or more tools within the tool magazine, moving tools to an RFID chip reading station, moving tools to a tool cleaning station, etc. This allows the machine to shorten the tool change time during normal operation and minimize the wait time when the operator is loading tools or other tasks need to be performed.

For example, during normal operation, the tool transporter 130 moves tools from storage positions in the tool magazine, or operator tool loading station, to the tool transfer position. If the operator makes a request that requires the tool transporter 130 (e.g., if the operator requests tools to be moved from the storage positions into the operator tool loading station) the ATC tool holder will become active and clamp the tool 120 and/or tool pot 125 in location. In another embodiment, the ATC tool holder will become active when needed for an automatic tool change process. When the machine calls for a tool change, the ATC can cycle when the machine is ready and does not have to wait for the tool transporter 130 to return. After the ATC cycle is complete, the tool transporter 130 exchanges the tool in the tool transfer position, when present, for the next tool and resumes the one or more other tasks (e.g., loading/unloading the operator tool set up station). When the one or more other tasks are completed, the tool transporter 130 returns to the tool transfer position to hold the next tool and, if necessary, deactivates the ATC tool holder.

In one embodiment, the ATC tool holder is only used if an operator requests the tool transporter 130 to load/unload one or more tools and/or tool pots from a tool loading station. That is, in one embodiment, the machine is operated without the use of the ATC tool holder unless an operator needs to load/unload one or more tools into the operator tool loading station.

Figure 2:
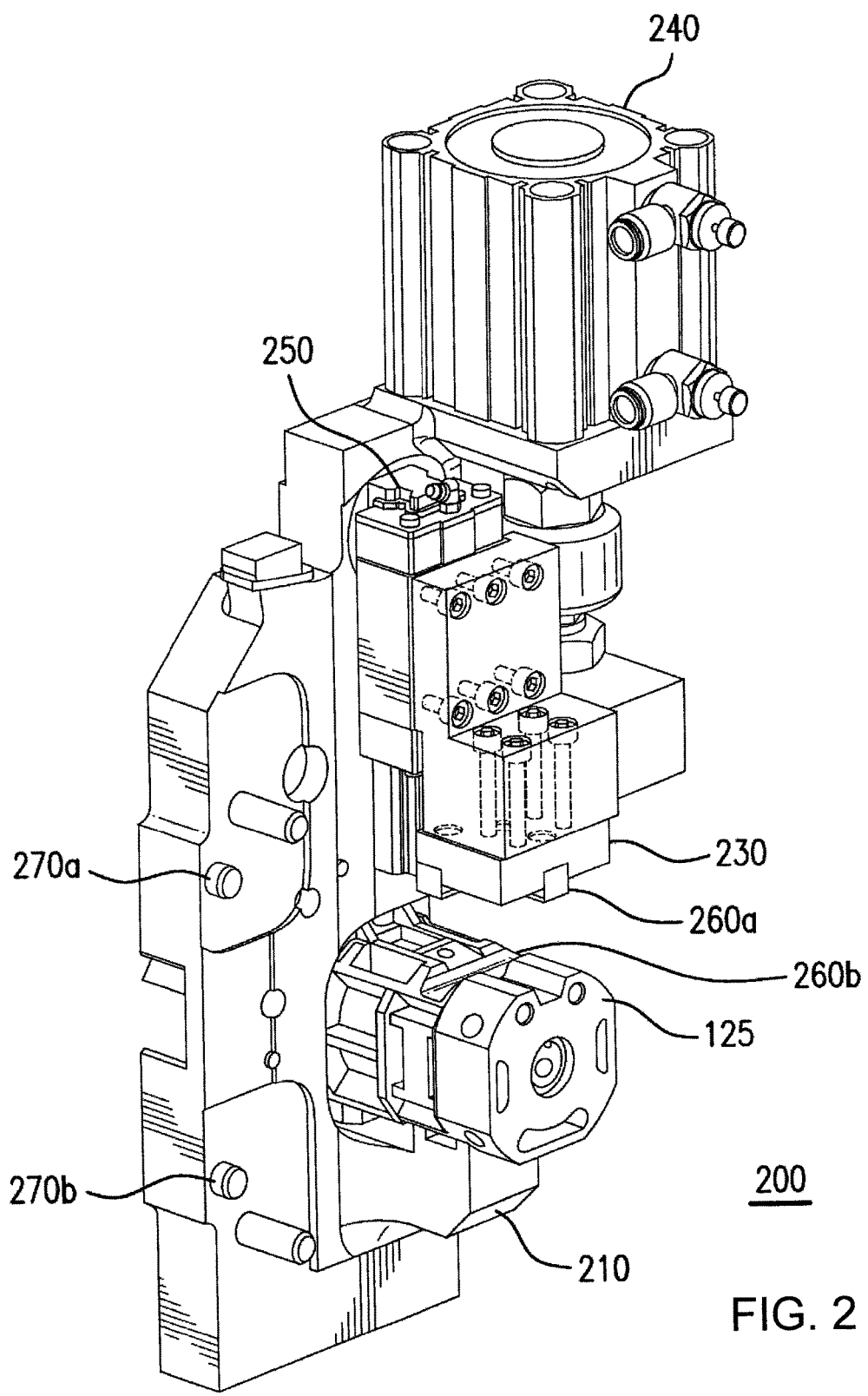
FIG. 2 illustrates an automatic tool changer (ATC) tool holder according to certain embodiments of the present disclosure.

FIG. 2 illustrates an ATC tool holder 200 according to one embodiment of the present disclosure. The ATC tool holder 200 includes a base 210 that is configured to support a tool 120 and/or tool pot 125. In one embodiment, the base 210 is formed of a one-piece cast. Further, in certain embodiments, the base 210 supports the tool pot 125, which contains the tool 120.

A block 230, which faces the base 210, is driven by a driving mechanism 240 (e.g., an air cylinder, electric motor, etc.) to move along a linear guide 250. The driving mechanism 240 drives the block 230 toward the base 210 until the tool 120 and/or tool pot 125 is secured between the base 210 and the block 230.

In certain embodiments, the tool 120 and/or tool pot 125 is keyed for alignment purposes. For example, the tool pot 125 may include a key 260b. Further, in one embodiment, the block 230 is provided with a corresponding key 260a. The key may be T-shaped or any other shape that can facilitate alignment of the tool 120 and/or tool pot 125.

Further, in one embodiment, the ATC tool holder 200 includes taper pins 270a, 270b to set a mounting position after the ATC tool holder 200 is first mounted to the ATC 110. The taper pins 270a, 270b may be located at various positions of the ATC tool holder 200. The taper pins 270a, 270b are configured to facilitate removal and remounting of the ATC tool holder 200 for servicing. Different embodiments of the ATC tool holder 200 may incorporate any number of taper pins, including zero. Further, other methods of mounting the ATC tool holder 200 and facilitating servicing of the ATC tool holder 200 may be utilized.

Figure 3:
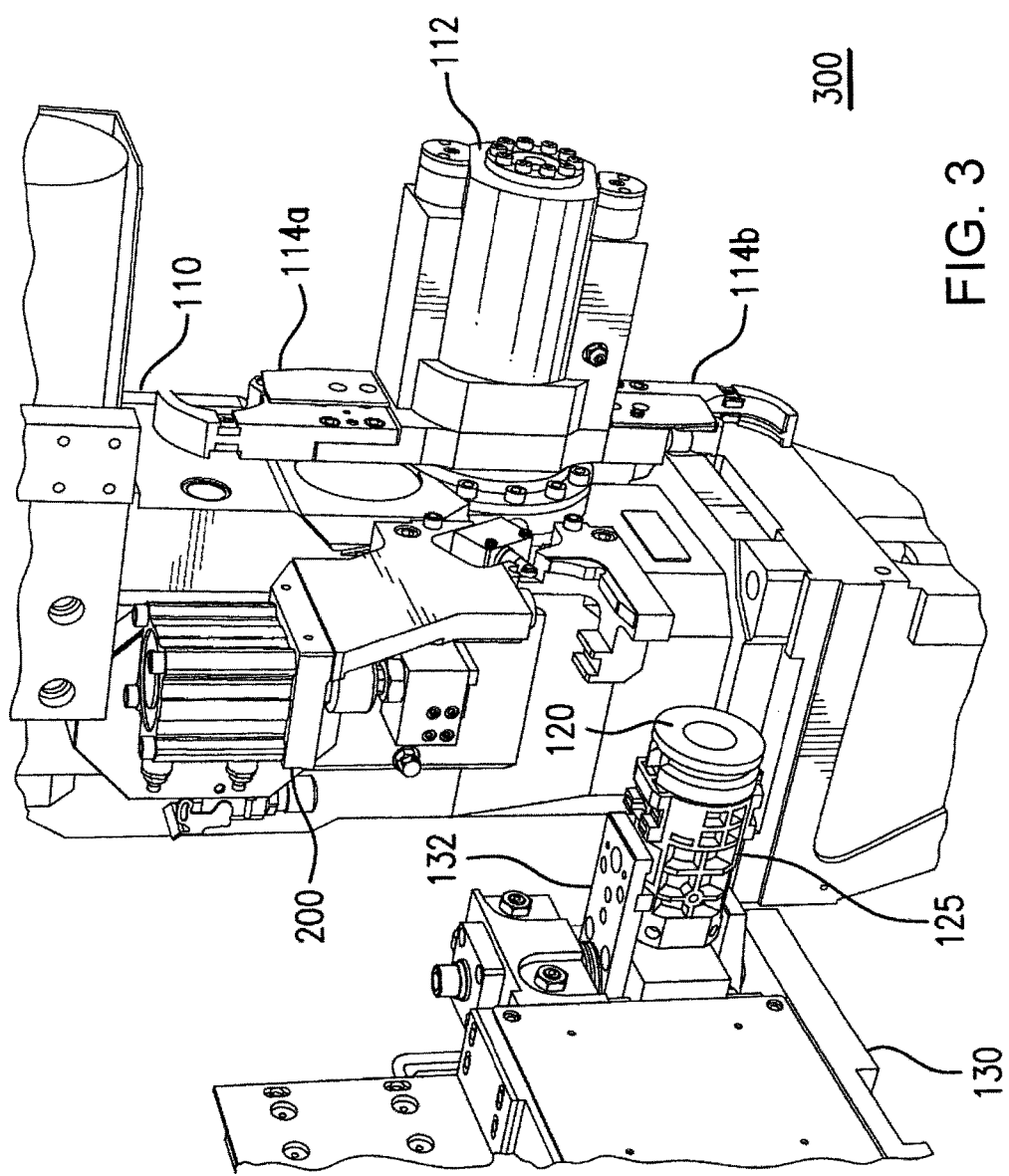
FIG. 3 illustrates an exemplary first view of a tool changing system according to certain embodiments of the present disclosure.

FIG. 3 illustrates a first exemplary view of a tool changing system 300 according to certain embodiments of the present disclosure. Similar to the tool changing system 100 illustrated in FIG. 1, the tool changing system 300 includes an ATC 110, tool changer 112 including a first arm 114a and second arm 114b, and tool transporter 130. The tool changing system 300 further includes the ATC tool holder 200. In one embodiment, the ATC tool holder 200 is attached to the ATC 110. In other embodiments, the ATC tool holder 200 is supported by a separate base, pedestal, or component of for example a machining center that incorporates the tool changing system 300. FIG. 3 illustrates an exemplary view in which the tool 120 and/or tool pot 125 is being transported by the tool transporter 130 to or from the tool transfer position. The tool 120 and/or tool pot 125 is held by a holding mechanism 132 (e.g., a clamp).

The ATC tool holder 200 is located at a position that allows transfer of the tool 120 and/or tool pot 125 to occur between the ATC tool holder 200 and the tool transporter 130, and/or between the ATC tool holder 200 and the tool changer 112. The location is set such that the ATC tool holder 200 holds the tool 120 and/or tool pot 125 at the tool transfer position. In certain embodiments, the ATC tool holder 200 is located at the tool transfer position of the ATC 110. In other embodiments, the ATC tool holder 200 is configured to move to and from the tool transfer position.

Figure 4:
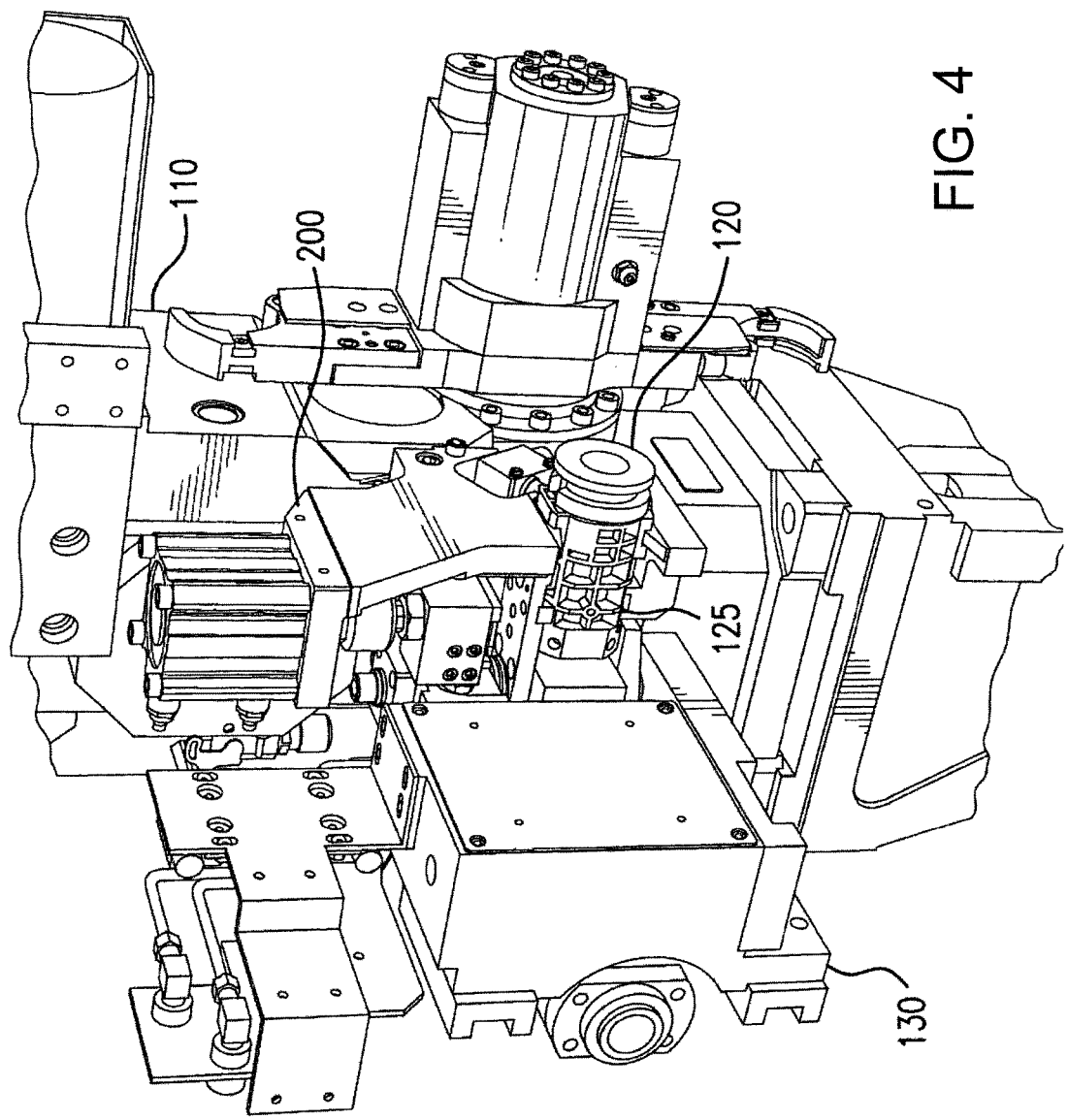
FIG. 4 illustrates an exemplary second view of the tool changing system according to certain embodiments of the present disclosure.
Figure 5:
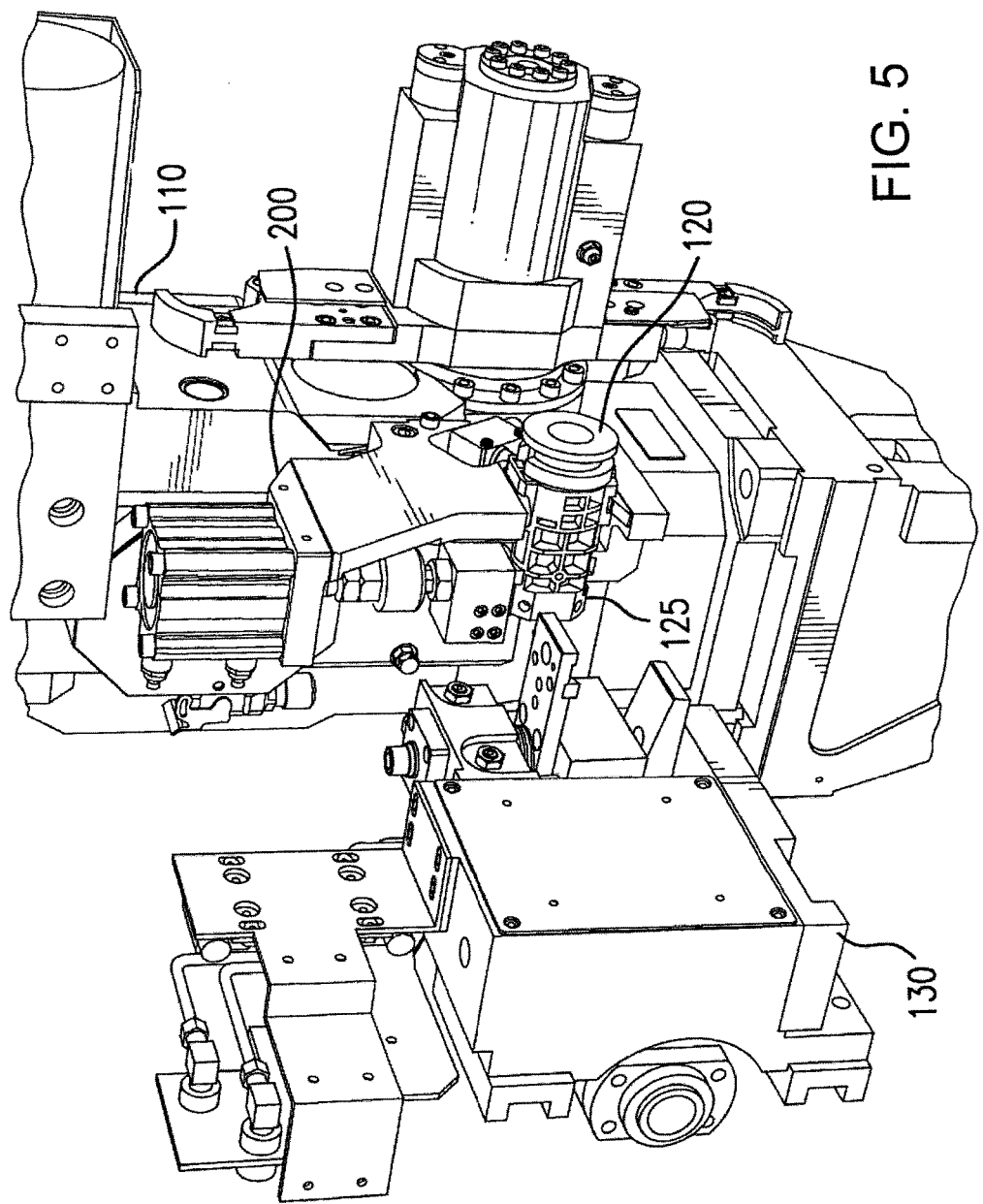
FIG. 5 illustrates an exemplary third view of the tool changing system according to certain embodiments of the present disclosure.

FIG. 4 illustrates a second exemplary view of the tool changing system 300, in which the tool transporter 130 holds the tool 120 and/or tool pot 125 at the tool transfer position. FIG. 5 illustrates a third exemplary view of the tool changing system 300, in which the ATC tool holder 200 holds the tool 120 and/or tool pot 125 and the tool transporter 130 has moved away from the tool transfer position. Depending on the embodiment, the ATC tool holder 200 may be active whenever, or only for a portion of time, a tool is present and the tool transporter 130 is not positioned at the tool transfer position. For example, the ATC tool holder 200 may only be active during an automatic tool change process or for the time needed for the tool changer 112 to remove the tool 120 and/or tool holder 125 from the tool transfer position.

As illustrated in FIG. 4, in one embodiment, the block 230 of the ATC tool holder 230 is obstructed by the holding mechanism 132 on the tool transporter 130. Accordingly, the tool transporter 130 must move away from the tool transfer position before the ATC tool holder 200 can hold the tool 120 and/or tool pot 125. However, in other embodiments, the tool transporter 130 and the ATC tool holder 200 are configured to hold different portions of the tool 120 and/or tool pot 125. In those embodiments, the tool transporter 130 need not move away before the ATC tool holder 200 can hold the tool 120 and/or tool pot 125. Thus, for example, the tool changing system 300 may be configured such that the tool transporter 130 does not release the tool 120 and/or tool pot 125 until the tool 120 and/or tool pot 125 is being held by the ATC tool holder 200. Moreover, as described above, in certain embodiments, the ATC tool holder 200 is only active during, or for a predetermined time before and/or after, an automatic tool change process.

Figure 6:
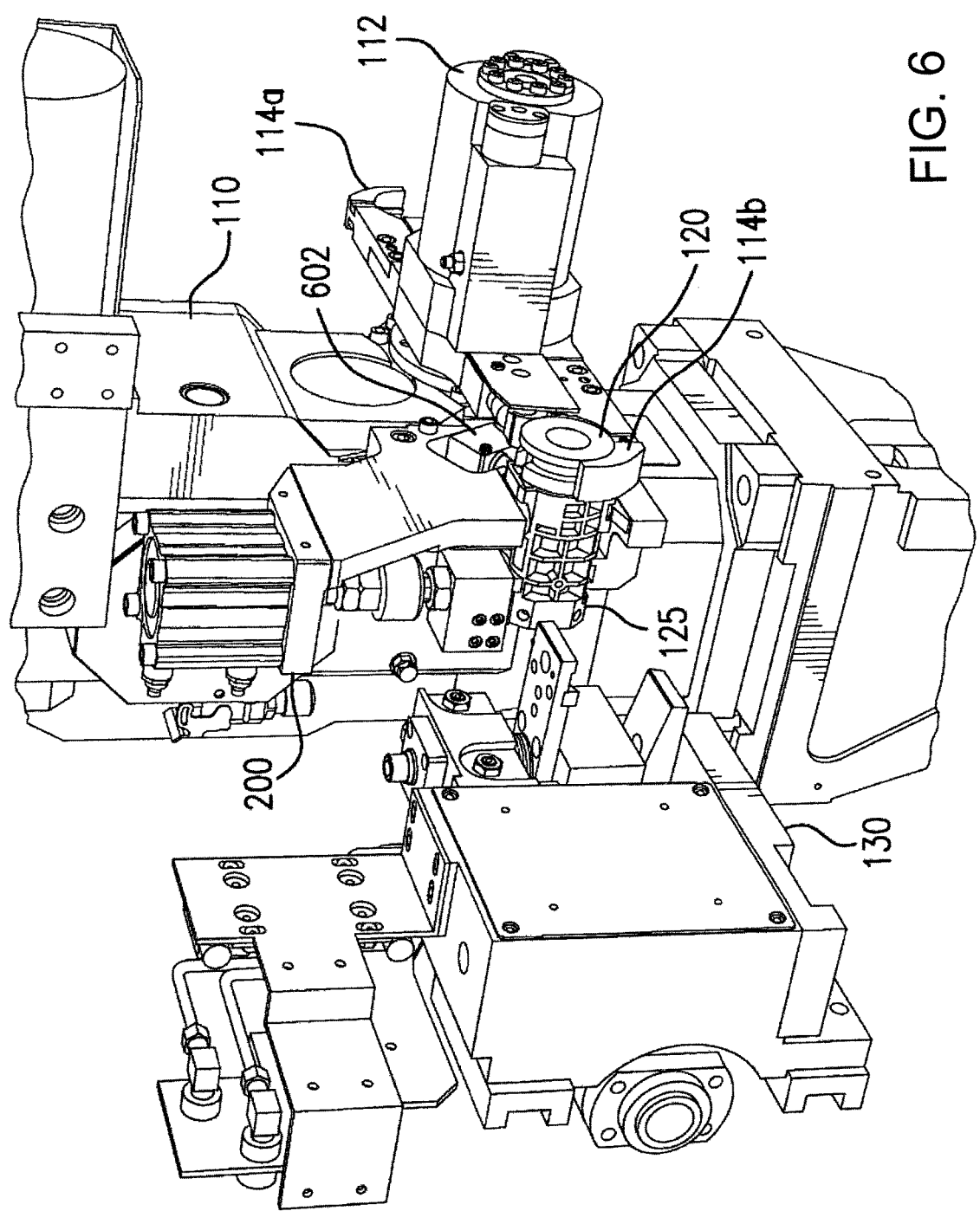
FIG. 6 illustrates an exemplary fourth view of the tool changing system according to certain embodiments of the present disclosure.

FIG. 6 illustrates a fourth exemplary view of the tool changing system 300, in which the tool 120 and/or tool pot 125 is held by the ATC tool holder 200 and the tool changer 112 has rotated into a position to allow pick up of the tool 120 and/or tool pot 125 for transfer to the tool changing position of the machine. In one embodiment, the tool changer 112 holds the tool 120 and moves along an axis parallel to the rotation axis of the tool changer 112 and in a direction away from the ATC 110 to remove the tool 120 from the tool pot 125. In another embodiment, both the tool 120 and tool pot 125 are removed. The tool changer 112 then rotates 180 degrees to provide the tool 120 to the tool change position. In one embodiment, after rotating 180 degrees, the tool changer further moves along an axis parallel to the rotation axis of the tool changer 112 to provide the tool 120 to the tool change position.

In one embodiment, the automatic tool change process includes one or a combination of the pick up of the tool 120 and/or tool pot 125 from the tool transfer position, the removal of the tool and/or tool pot 125 from the tool transfer position, the transfer of the tool 120 and/or tool pot 125 to the tool change position, and the placing of the tool 120 and/or tool pot 125 in the tool change position or on the machine. Further, or alternatively, in one embodiment, the automatic tool change process includes the one or more steps for transferring a tool from the tool change position or the machine to the tool transfer position.

Figure 7:
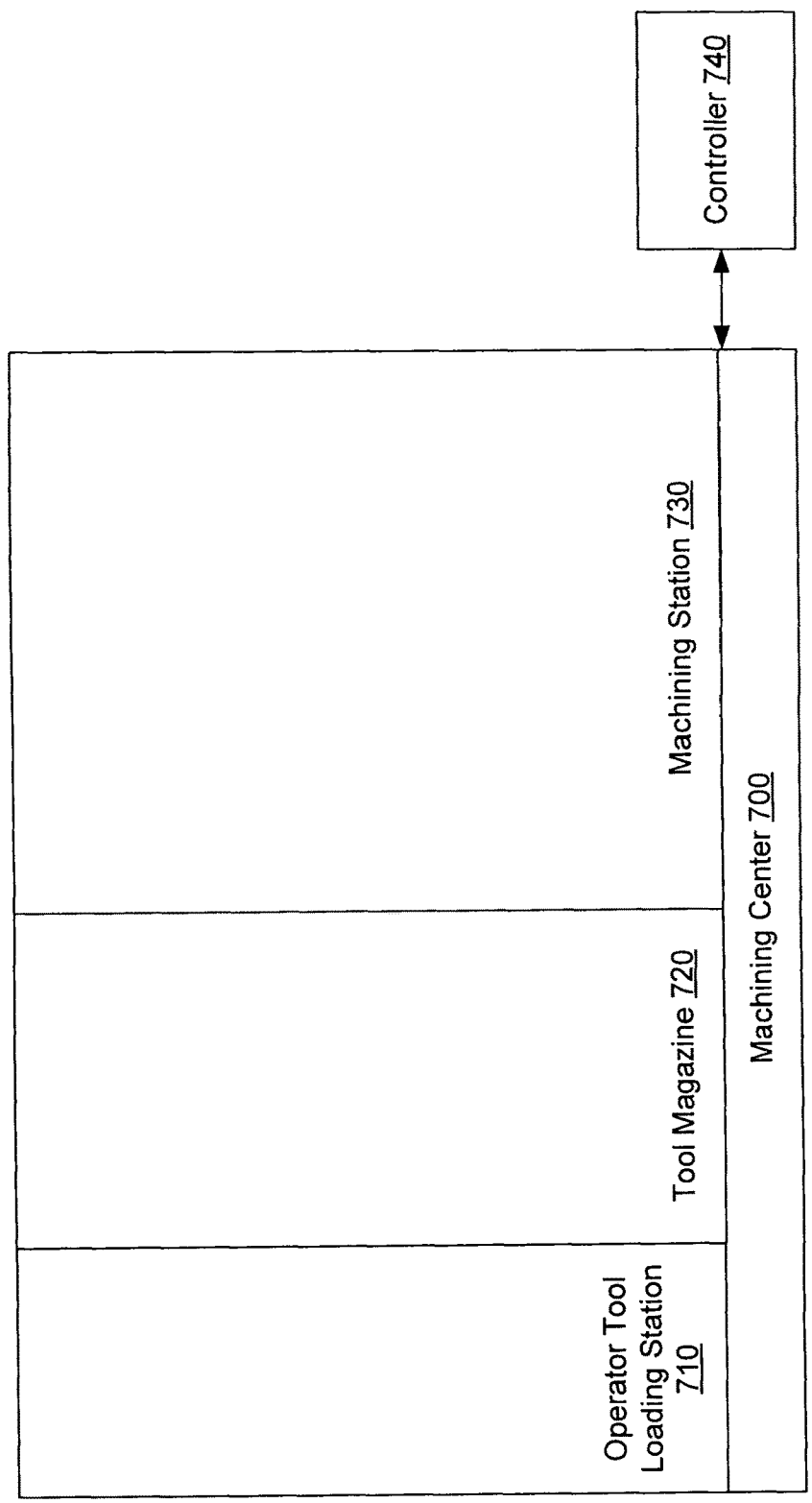
FIG. 7 illustrates a machining center according to certain embodiments of the present disclosure.

FIG. 7 illustrates an exemplary machining center 700, which incorporates the tool changing system 300, according to certain embodiments of the present disclosure. In certain embodiments, the machining center 700 is a Computer Numerical Control (CNC) machining center (e.g., with some method for changing a tool on the spindle) or machining center of other types including a horizontal or vertical machining center, lathes (e.g., having turrets with milling functionality), mill-turn machines, or any other machine in which an ATC style tool changing device can be utilized. The machining center 700 is divided into an operator tool loading station 710, a tool magazine 720, and a machining station 730. Further, a controller 740 is configured to control one or more operations and/or processes performed by the machining center 700.

In one embodiment, the operator tool loading station 710, tool magazine 720, and tool transporter 130 are part of a magazine system. In another embodiment, the ATC 110 and the tool holder 200 are also part of the magazine system.

The operator tool loading station 710 is configured to receive and/or provide one or more tools and/or tool pots from/to an operator of the machining center 700. In one embodiment, the operator tool loading station 710 includes four slots in which tools and/or tool pots can be inserted or removed. The four slots are accessed by opening a door on the machining center 700. In another embodiment, the operator tool loading station 710 includes a rotating wall. The wall has two sides with only one side being accessible to an operator, and one side accessible to the tool transporter 130, at a given time. When the wall is rotated by 180 degrees, the wall on the inside of the machining center 700 is rotated to the outside such that the operator can add or remove tools and/or tool pots to/from the operator tool loading station 710.

The tool magazine 720 is configured to store one or more tools and/or tool pots within the machining center 700. In one embodiment, the tool magazine 720 has a rack configuration. In other embodiments, the tool magazine 720 is any one or a combination of a ring style, chain style, rack configuration, etc. depending on factors such as tool capacity required for the machining center 700. In one embodiment, the tool magazine 720 includes a plurality of slots in which the tool 120 and/or tool pot 125 is inserted for storage.

In one embodiment, the machining station 730 includes the ATC 110, the ATC tool holder 200, and the machine that utilizes one or more tools (e.g., the tool 120). As described above, the tool transporter 130 is configured to transport one or more tools and/or tool pots between the operator tool loading station 710, tool magazine 720, and the machining station 730. In one embodiment, the tool transporter 130 moves along a linear guide or via another transport or guidance mechanism in the machining center 700.

Figure 8:
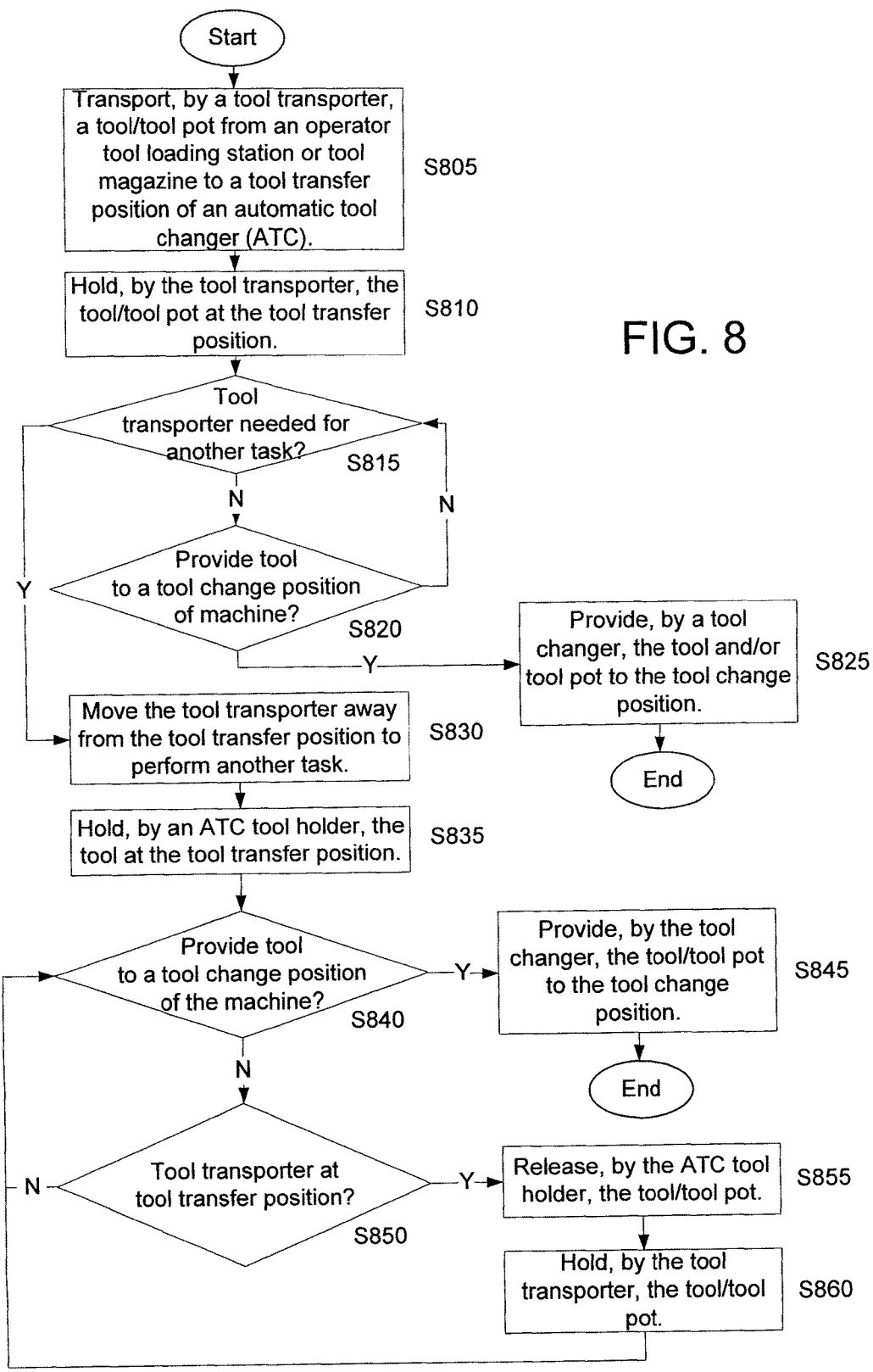
FIG. 8 illustrates an exemplary process performed by the tool changing system.

FIG. 8 illustrates an exemplary method of operation for a tool changing system, such as the tool changing system 300 illustrated in FIG. 3. In one embodiment, the controller 740 is configured to control the operations and/or processes performed in the exemplary method. In other embodiments, a combination of different controllers may be used to control the operations and/or processes.

At step S805, the tool transporter 130 transports a tool 120 and/or tool pot 125, needed by the machine to process a work piece, from the operator tool loading station 710 or tool magazine 720 to a tool transfer position of the ATC 110. At step S810, the tool transporter 130 holds the tool 120 and/or tool pot 125 at the tool transfer position. In another embodiment, the tool transporter 130 may drop off the tool 120 and/or tool pot 125 on a tool support (e.g., base 210). At step S815 a determination is made as to whether the tool transporter 130 is needed to perform another task. In one embodiment, the determination is made by the controller 740. As described above, examples of the other tasks include moving one or more tools between the operator tool loading station 710 and the tool magazine 720, providing another tool to the tool transfer position, rearranging one or more tools in the tool magazine 720, moving tools to an RFID chip reading station, moving tools to a tool cleaning station, etc. Alternatively, or additionally, a determination is made as to whether the tool transporter 130 is located at or within a predetermined distance from the tool transfer position.

For example, in one embodiment, the controller 740 is configured to direct the tool transporter 130 to retrieve a second tool and/or tool pot from the operator tool loading station 710 or tool magazine 720 after transporting a first tool and/or tool pot to the tool transfer position. Further, the controller 740 directs the tool transporter 130 to transport the second tool and/or tool pot to the tool transfer position. The controller 740 directs the tool transporter 130 in such a manner that the second tool and/or tool pot arrives at the tool transfer position any time after the ATC 110 moves the first tool and/or tool pot away from the tool transfer position. For example, when the ATC 110 provides the first tool and/or tool pot to the machine or the first tool and/or tool pot is in the process of being moved to the tool change position.

In another example, the controller 740 is configured to direct the tool transporter 130 to retrieve a second tool and/or tool pot from the operator tool loading station 710, and to transport the second tool and/or tool pot to the tool magazine 720.

When the tool transporter 130 is not needed to perform another task, in step S820, a determination is made as to whether the tool 120 and/or tool pot 125 held by the tool transporter 130 is to be provided to the tool change position of the machine. When the tool 120 and/or tool pot 125 is not to be provided to the tool change position of the machine, the process returns to step S815. However, when the tool 120 and/or tool pot 125 is to be provided to the tool change position, the tool changer 112 provides the tool 120 and/or tool pot 125 to the tool change position. For example, the controller 740 directs the tool changer 112 to remove the tool 120 from the tool pot 125, and rotate such that the tool 120 is moved to the tool change position of the machine. In another example, the controller 740 directs the tool changer 112 to remove the tool pot 125 containing the tool 120.

When the tool transporter 130 is needed to perform another task, at step S830, the tool transporter 130 moves away from the tool transfer position to perform the other task. Subsequently, when the tool transporter 130 reaches a predetermined distance from the tool transfer position, the ATC tool holder 200 holds the tool 120 and/or tool pot 125 at the tool transfer position. For example, the controller 740 directs the block driver 240 to drive the block 230 toward the base 210 until the tool 120 and/or tool pot 125 is secured between the base 210 and block 230. In another embodiment, the ATC tool holder 200 does not hold the tool 120 and/or tool pot 125 until a predetermined time before or when an automatic tool change process is initiated.

As described above, in one embodiment, the holding mechanism 132 of the tool transporter 130 obstructs the block 230 from holding the tool 120 and/or tool pot 125. Accordingly, the ATC tool holder 200 holds the tool 120 and/or tool pot 125 after the tool transporter 130 moves away from the tool transfer position. However, in other embodiments, when the block 230 is not obstructed by the holding mechanism 132, the tool transporter 130 need not move away prior to the ATC tool holder 200 holding the tool 120 and/or tool pot 125. For example, the ATC tool holder 200 may hold the tool 120 and/or tool pot 125 prior to the tool transporter 130 releasing the tool and/or tool pot or moving away from the tool transfer position.

After the ATC tool holder 200 holds the tool 120 and/or tool pot 125 at step S835, a determination is made as to whether the tool 120 and/or tool pot 125 is to be provided to a tool change position of the machine (i.e., an automatic tool change process is to be initiated). When the tool 120 and/or tool pot 125 is to be provided to the tool change position, the tool changer 112 provides the tool 120 and/or tool pot 125 to the tool change position at step S845. As described above, in one example, the controller 740 directs the tool changer 112 to remove the tool 120 from the tool pot 125, and rotate such that the tool 120 is moved to the tool change position of the machine.

When the tool 120 and/or tool pot 125 is not to be provided to the tool change position of the machine, the process proceeds to step S850, at which time a determination is made as to whether the tool transporter 130 has returned to the tool transfer position or a predetermined distance within the tool transfer position. If the tool transporter 130 is not at the tool transfer position or within the predetermined distance of the tool transfer position, the process returns to step S840. However, when the tool transporter 130 is at the tool transfer position or within the predetermined distance of the tool transfer position, the process proceeds to step S855, at which time the ATC tool holder 200 releases the tool and/or tool pot. As described above, in one embodiment, the ATC tool holder 200 only holds the tool and/or tool pot for an automatic tool change process. Thus, step S855 is skipped when the ATC tool holder 200 is not holding the tool and/or tool pot. In step S860, the tool transporter 130 holds the tool and/or tool pot in step S860. In another embodiment, the tool transporter 130 does not hold the tool and/or tool pot until a predetermined time before or when the automatic tool change process is initiated.

As described above, in one embodiment, the holding mechanism 132 of the tool transporter 130 obstructs the block 230 from holding the tool 120 and/or tool pot 125. Accordingly, the ATC tool holder 200 must release the tool 120 and/or tool pot 125 before the tool transporter 130 can hold the tool 120 and/or tool pot 125 at the tool transfer position. However, in other embodiments, when the block 230 is not obstructed by the holding mechanism 132, the tool transporter 130 need not wait until the ATC tool holder 200 releases the tool 120 and/or tool pot 125. For example, the ATC tool holder 200 may release the tool 120 and/or tool pot 125 after the tool transporter 130 holds the tool and/or tool pot or moves to the tool transfer position.

In certain embodiments, the ATC tool holder 200 includes one or more sensors to confirm the position of the block 230. In one embodiment, the position information is used to determine whether the tool 120 and/or tool pot 125 is secured by the ATC tool holder 200. In another embodiment, the position information is used to determine whether the ATC tool holder 200 is in an open or closed state. Examples of the one or more sensors include a proximity sensor.

In one embodiment, the tool transporter 130 moves away from the ATC 110 after placing the tool 120 and/or tool pot 125 on a tool support (e.g., base 210) located at the tool transfer position. In other embodiments, the controller 740 directs the tool transporter 130 to move away from the ATC 110 after confirming that the tool 120 and/or tool pot 125 are being held by the ATC tool holder 200. In certain embodiments, the controller 740 makes this determination based on the one or more sensors.

Further, in certain embodiments, the ATC 110 and/or the ATC tool holder 200 includes one or more tool and/or tool pot detecting sensors 602, as illustrated in FIG. 6 for example. In one embodiment, the one or more sensors include a limit switch that is in incorporated in the ATC tool holder 200. However, it should be noted that other switches or sensor types (e.g., proximity, image, etc.) may be used to detect the tool 120 and/or tool pot 125. Further, the one or more tool and/or tool pot detecting sensors may be incorporated into various different locations within the machining center 700.

Figure 9:
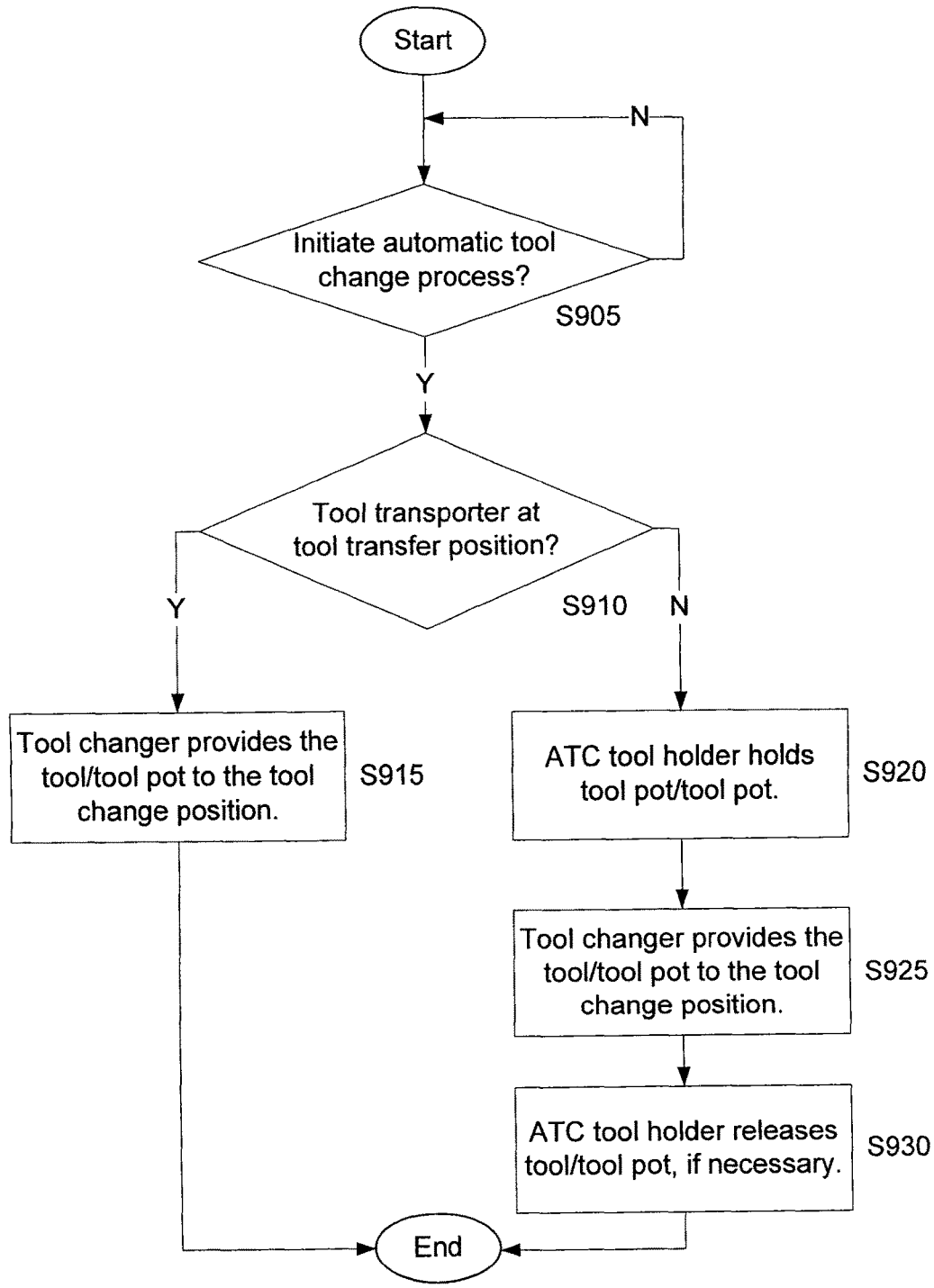
FIG. 9 illustrates an exemplary process performed for an automatic tool change process.

FIG. 9 illustrates a method of operation for a tool change system, such as the tool changing system 300, when initiating an automatic tool change process according to certain embodiments of the present disclosure. The method may be performed independent of the method illustrated in FIG. 8 or in conjunction with FIG. 8, for example, when providing the tool to the tool change position of a machine in steps S820 and/or S845. In one embodiment, the controller 740 is configured to control the operations and/or processes performed in this method. In other embodiments, a combination of different controllers may be used to control the operations and/or processes.

At step S905, the controller 740 determines whether an automatic tool change process is to be initiated. For example, the controller 740 determines whether a tool and/or tool pot at the tool transfer position is to be provided to the tool change position of the machine (e.g., as in steps S820 and/or S840), whether the machine requires a tool change, etc.

In one embodiment, the controller 740 waits until a determination is made that the automatic tool change process is to be initiated. When the controller 740 determines that the automatic tool change process is to be initiated, the controller 740 proceeds to step S910 and determines whether the tool transporter 130 is at the tool transfer position. In one embodiment, the controller 740 waits until a predetermined time before the initiation of the automatic tool change process (e.g., at least the minimum amount of time needed for the ATC tool holder 200 to activate and hold the tool and/or tool pot) to determine whether the tool transporter 130 is at the tool transfer position.

When the controller 740 determines that the tool transporter 130 is at the tool transfer position, at step S915, the tool changer 112 provides the tool 120 and/or tool pot 125 to the tool change position. If the tool/tool pot 125 is not being held by the tool transporter 130, the controller 740 instructs the tool transporter 130 to hold the tool and/or tool pot 125 prior to instructing the tool changer 112 to perform the transfer. When the controller 740 determines that the tool transporter 130 is not at the tool transfer position, at step S920, the controller 740 instructs the ATC tool holder 200 to hold the tool 120 and/or tool pot 125. The tool changer 112 provides the tool 120 and/or tool pot 125 to the tool change position at step S925, after the ATC tool holder holds the tool 120 and/or tool pot 125. In one embodiment, the controller 740 instructs the tool changer 112 to provide the tool 120 and/or tool pot to the tool change position after confirming that the ATC tool holder 200 is holding the tool 120 and/or tool pot 125 (e.g., using one or more of the position sensors described above).

Depending on the embodiment, the tool transporter 130 and/or ATC tool holder 200 holds the tool 120, the tool pot 125 containing the tool 120, or the tool pot 125 and the tool 120. In one embodiment, when the tool transporter 130 and/or ATC tool holder 200 holds the tool pot 125 containing the tool 120, the tool changer 112 only transfers the tool 120 from the tool transfer position to the tool change position. The tool changer 112 may provide another tool from the tool change position to the tool pot 125. In other embodiments, when the tool 120 or the tool 120 and tool pot 125 are being held by the tool transporter 130 and/or ATC tool holder 200, the tool transporter 130 and/or ATC tool holder 200 are keyed in a manner to allow the tool 120 or tool 120 and tool pot 125 to be removed from the tool transporter 130 and/or ATC tool holder 200 while in the holding position.

In step S930, the ATC tool holder 200 optionally releases the tool pot 125 if necessary. Depending on the embodiment, the ATC tool holder 200 releases the tool pot 125 at the end or a predetermined time before or after the automatic tool change process ends, when the tool transporter 130 returns, etc. As described above, in one embodiment, the tool pot 125 is supported by a tool support (e.g., the base 210) at the tool transfer position when the tool pot 125 is not being held by the tool transporter 130 and/or the ATC tool holder 200. Further, in one embodiment, a tool support is also provided at the tool change position. 100671 FIG. 10 is a block diagram showing an example of a hardware configuration of a computer 1000 that can be configured to perform one or a combination of the functions of the machining center 700, such as the controller 740.

Figure 10:
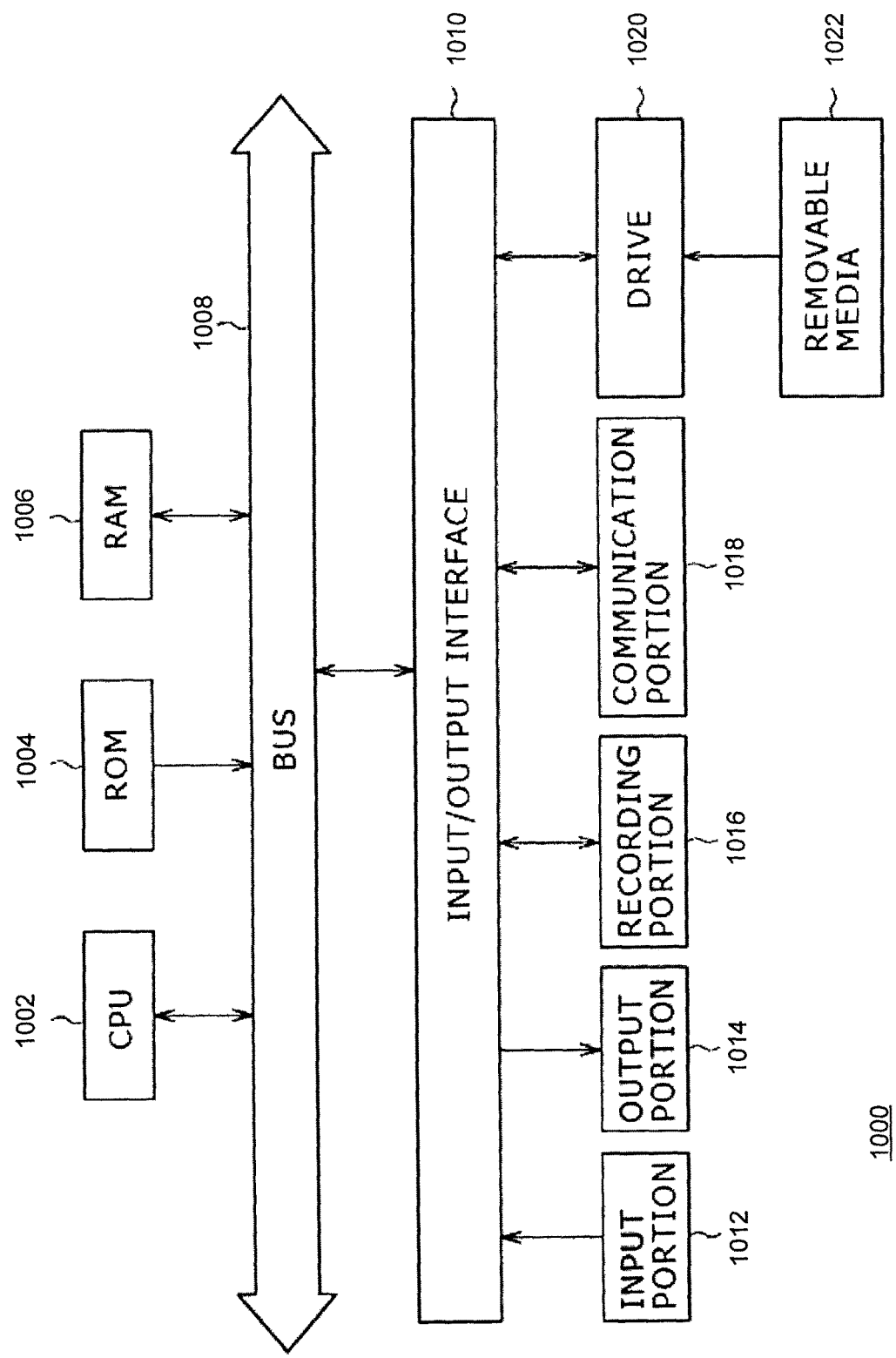
FIG. 10 illustrates an exemplary computer.

As illustrated in FIG. 10, the computer 1000 includes a central processing unit (CPU) 1002, read only memory (ROM) 1004, and a random access memory (RAM) 1006 interconnected to each other via one or more buses 1008. The one or more buses 1008 are further connected with an input-output interface 1010. The input-output interface 1010 is connected with an input portion 1012 formed by a keyboard, a mouse, a microphone, remote controller, etc. The input-output interface 1010 is also connected to an output portion 1014 formed by an audio interface, video interface, display, speaker, etc.; a recording portion 1016 formed by a hard disk, a non-volatile memory or other non-transitory computer-readable storage medium; a communication portion 1018 formed by a network interface, modem, USB interface, fire wire interface, etc.; and a drive 1020 for driving removable media 1022 such as a magnetic disk, an optical disk, a magneto-optical disk, a semiconductor memory, etc.

According to one embodiment, the CPU 1002 loads a program stored in the recording portion 1016 into the RAM 1006 via the input-output interface 1010 and the bus 1008, and then executes a program configured to provide the functionality of the one or combination of the functions of the machining center 700, such as the controller 740.

Those skilled in the art will recognize, upon consideration of the above teachings, that certain of the above exemplary embodiments, for example using the controller 740, are based upon use of a programmed processor. However, embodiments of the present disclosure are not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the operations and processes, such as those by the controller 740, and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present disclosure. The term non-transitory does not suggest that information cannot be lost by virtue of removal of power or other actions. Such alternative storage devices should be considered equivalents.

Certain embodiments described herein, are or may be implemented using one or more programmed processors executing programming instructions that are broadly described above in flow chart form that can be stored on any suitable electronic or computer readable storage medium. However, those skilled in the art will appreciate, upon consideration of the present disclosure, that the processes described above can be implemented in any number of variations and in many suitable programming languages without departing from embodiments of the present disclosure. For example, the order of certain operations carried out can often be varied, additional operations can be added or operations can be deleted without departing from certain embodiments of the disclosure. Such variations are contemplated and considered equivalent.

While certain illustrative embodiments have been described, it is evident that many alternatives, modifications, permutations and variations will become apparent to those skilled in the art in light of the foregoing description.

The invention claimed is:

1. A tool changing system, comprising:
   a tool magazine configured to store at least one tool received at a tool loading station;
   a tool transporter configured to transport the at least one tool from the tool loading station or the tool magazine to a tool transfer position, and to hold the at least one tool at the tool transfer position during an automatic tool change process; and
   an automatic tool changer exchanging the at least one tool between the tool transfer position and a tool change position of a machine, a longitudinal axis of the at least one tool when the at least one tool is held by the tool transporter is parallel to the longitudinal axis of the at least one tool when the at least one tool is located at the tool change position;
   the automatic tool changer, including:
      a tool holder configured to hold the at least one tool at the tool transfer position during the automatic tool change process, instead of the tool transporter when the tool transporter is not positioned at the tool transfer position; and
      a tool changer having a first arm assembly and a second arm assembly, the tool changer configured to rotate about a tool changer axis of rotation so as to move the at least one tool between the tool transfer position and the tool change position during the automatic tool change process, each of the first arm assembly and the second arm assembly configured to hold the at least one tool in each of the tool transfer position and the tool change position, and each of the first arm assembly and the second arm assembly configured to be rotated between each of the tool transfer position and the tool change position,
   wherein the tool holder is configured to hold the at least one tool at the tool transfer position when the tool transporter is not positioned at the tool transfer position and the automatic tool change process is not being performed,
   wherein the tool holder includes a base, a block positioned above the base, a linear guide which guides a movement of the block in an up and down direction, and a driving mechanism that drives the block along the linear guide toward the base until the tool holder secures the at least one tool between the base and the block,
   wherein the tool holder separates the tool changer and the tool transporter such that the tool changer is disposed on a first side of the tool holder and the tool transporter is disposed on an opposing, second side of the tool holder, wherein when the at least one tool is held by the tool holder at the tool transfer position, the longitudinal axis of the at least one tool is parallel to the tool changer axis of rotation, and extends through each of the first side of the tool holder, the second side of the tool holder, and the tool transfer position, and the tool transfer position when the at least one tool is transferred from the tool transporter to the tool holder, is in a same location with respect to the machine as is the tool transfer position when the at least one tool is transferred from the tool holder to the tool changer such that the location of the tool transfer position is static.

2. The tool changing system according to claim 1, further comprising:

a controller configured to determine whether the tool transporter is positioned at the tool transfer position when the automatic tool change process is to be initiated, wherein the controller is configured to instruct the tool holder to hold the at least one tool based on the determination of whether the tool transporter is positioned at the tool transfer position.

3. The tool changing system according to claim 1, further comprising:

a tool support configured to support the at least one tool at the tool transfer position.

4. The tool changing system according to claim 1, wherein the tool transporter is a robot that is configured to transport the at least one tool between each of the tool loading station, the tool magazine, and the tool transfer position.

5. The tool changing system according to claim 1, wherein the tool transporter is configured to transport a tool pot containing the at least one tool from the tool magazine to the tool transfer position.

6. The tool changing system according to claim 1, wherein the tool holder is configured to hold a tool pot containing the at least one tool at the tool transfer position.

7. The tool changing system according to claim 1, wherein the tool magazine is a machine tool rack magazine.

* * * * *